US011181899B2

(12) United States Patent
Zhang et al.

(10) Patent No.: US 11,181,899 B2
(45) Date of Patent: Nov. 23, 2021

(54) SYSTEM AND METHOD FOR MONITORING MACHINE ANOMALIES VIA CONTROL DATA

(71) Applicant: MACHINEMETRICS, INC., Northampton, MA (US)

(72) Inventors: Lou Zhang, Northampton, MA (US); Suhas Srinivasan, Amherst, MA (US)

(73) Assignee: MACHINEMETRICS, INC., Northampton, MA (US)

( * ) Notice: Subject to any disclaimer, the term of this patent is extended or adjusted under 35 U.S.C. 154(b) by 22 days.

(21) Appl. No.: 16/527,478

(22) Filed: Jul. 31, 2019

(65) Prior Publication Data

US 2020/0041989 A1 Feb. 6, 2020

Related U.S. Application Data

(60) Provisional application No. 62/712,556, filed on Jul. 31, 2018.

(51) Int. Cl.
*G05B 23/02* (2006.01)
*G05B 19/418* (2006.01)

(52) U.S. Cl.
CPC ..... *G05B 23/0254* (2013.01); *G05B 19/4183* (2013.01); *G05B 19/4184* (2013.01); *G05B 19/41875* (2013.01)

(58) Field of Classification Search
CPC ............ G05B 23/0254; G05B 19/4183; G05B 19/41875; G05B 19/4184
See application file for complete search history.

(56) References Cited

U.S. PATENT DOCUMENTS

2017/0032266 A1 * 2/2017 Gopalakrishnan ..... G06N 7/005

OTHER PUBLICATIONS

Caron Engineering, D TectIT "Detects Machine Irregularities"—https://www.caroneng.com/products/dtect-it.
Dunteman, George H., "Principle Components Analysis" Research Triangle Institute; Sage University Paper; Book (1989)—https://books.google.com/books?hl=en&lr=&id=Pzwt-CMMt4UC&oi=fnd&pg=PA5&dq=Principal+Components+Analysis+&ots=igdrwEhUg7&sig=O8ilYLzOzvBFwbUnlGX6yVYgl-M#v=onepage&q=Principal%20Components%20Analysis&f=false.
Kumar, Rishav, "Understanding Principal Component" Jan. 2, 2018—https://medium.com/@aptrishu/understanding-principle-component-analysis-e32be0253ef0.
Hyndman, Rob J., "A New R Package For Detecting Unusual Time Series" May 31, 2015—https://robjhyndman.com/hyndsight/anomalous/.
Wikipedia "DBSCAN" Last edited Jul. 16, 2019—https://en.wikipedia.org/wiki/DBSCAN.

* cited by examiner

*Primary Examiner* — Manuel A Rivera Vargas
(74) *Attorney, Agent, or Firm* — Grogan, Tuccillo & Vanderleeden, LLP

(57) ABSTRACT

A system for monitoring machine anomalies via control data is provided. The system includes one or more sensors operative to generate control data from a machine; and a controller in electronic communication with the one or more sensors. The controller is operative to: receive the control data from the one or more sensors; generate a latent structure of part signatures from the control data; identify an anomaly within the latent structure of part signatures; and generate an indictor conveying the anomaly.

15 Claims, 19 Drawing Sheets

| PART_COUNT | TIMESTAMP | DIST |
|---|---|---|
| 1 | 2018-04-04 12::00:04 | NA |
| 1 | 2018-04-04 12:01:26 | 82 |
| 1 | 2018-04-04 12:02:48 | 82 |
| 1 | 2018-04-04 12:05:02 | 134 |
| 1 | 2018-04-04 12:06:23 | 81 |
| 1 | 2018-04-04 12:07:45 | 82 |
| 1 | 2018-04-04 12:09:06 | 81 |
| 1 | 2018-04-01 12:10:28 | 82 |
| 1 | 2018-04-04 12:11:50 | 82 |
| 1 | 2018-04-04 12:13:11 | 81 |
| 1 | 2018-04-04 12:14:33 | 82 |
| 1 | 2018-04-04 12:15:54 | 81 |
| 1 | 2018-04-04 12:17:16 | 82 |
| 1 | 2018-04-04 12:18:38 | 82 |
| 1 | 2018-04-04 12:19:59 | 81 |
| 1 | 2018-04-04 12:21:21 | 82 |
| 1 | 2018-04-04 12:22:43 | 82 |
| 1 | 2018-04-04 12:24:04 | 81 |
| 1 | 2018-04-04 12:25:25 | 81 |

| Dist | Count |
|---|---|
| 82 | 139 |
| 81 | 91 |
| 80 | 11 |
| 83 | 6 |
| 134 | 6 |
| 135 | 4 |
| 79 | 3 |
| 133 | 2 |
| 84 | 1 |
| 85 | 1 |
| 145 | 1 |
| 163 | 1 |
| 195 | 1 |

92

96

98

| C1LOAD | S1LOAD | S22LOAD | X1LOAD | X2LOAD | Y1LOAD | Z1LOAD | Z2LOAD | PC1 | PC2 |
|---|---|---|---|---|---|---|---|---|---|
| 162 | 26 | 64 | 34 | 1 | 11 | 11 | 20 | -38.1055352 | 14.0896783 |
| 162 | 26 | 64 | 34 | 1 | 11 | 11 | 20 | -38.1055352 | 14.0896783 |
| 162 | 26 | 64 | 34 | 1 | 11 | 11 | 20 | -38.1055352 | 14.0896783 |
| 162 | 26 | 64 | 34 | 1 | 11 | 11 | 20 | -38.1055352 | 14.0896783 |
| 162 | 31 | 125 | 11 | 4 | 3 | 2 | 1 | -95.1825812 | -4.6390834 |
| 162 | 152 | 125 | 11 | 3 | 2 | 1 | 223 | -151.4109086 | 106.0129854 |
| 162 | 152 | 193 | 11 | 3 | 2 | 1 | 223 | -215.2756344 | 84.2610905 |
| 162 | 152 | 193 | 4 | 3 | 125 | 11 | 223 | -212.9810221 | 87.6779096 |
| 162 | 0 | 1 | 4 | 4 | 125 | 11 | 4 | 33.2396616 | 9.6601578 |
| 162 | 126 | 1 | 6 | 4 | 7 | 5 | 4 | -9.1153291 | 122.3773566 |
| 162 | 126 | 9 | 6 | 15 | 7 | 5 | 4 | -17.5520858 | 119.5391451 |
| 162 | 144 | 9 | 23 | 15 | 4 | 4 | 4 | -24.0135016 | 138.8684648 |
| 162 | 144 | 7 | 23 | 15 | 4 | 4 | 4 | -22.1351273 | 139.5082265 |
| 162 | 186 | 7 | 12 | 15 | 5 | 7 | 4 | -35.1244270 | 176.6663768 |
| 162 | 186 | 16 | 12 | 17 | 5 | 7 | 14 | -44.5328739 | 173.6684733 |
| 162 | 27 | 16 | 28 | 17 | 5 | 4 | 14 | 5.7927419 | 28.8970009 |
| 162 | 27 | 3 | 28 | 14 | 5 | 4 | 10 | 18.5691317 | 33.1588749 |
| 162 | 27 | 3 | 28 | 14 | 5 | 4 | 10 | 18.5691317 | 33.1588749 |
| 162 | 20 | 7 | 25 | 17 | 5 | 5 | 12 | 16.7754027 | 24.8036698 |
| 162 | 163 | 7 | 8 | 8 | 3 | 5 | 12 | -27.7117854 | 154.7718210 |

| DX.1.PCONE | DX.1.PCTWO | DX.2.PCONE | DX.2.PCTWO | DX.3.PCONE | DX.3.PCTWO | DX.4.PCONE | DX.4.PCTWO | DX.5.PCONE | DX.5.PCTWO | DX.6.PCONE | DX.6.PCTWO |
|---|---|---|---|---|---|---|---|---|---|---|---|
| 0.0000000 | 0.000000000 | 5.78069100 | -0.94837270 | 7.33617120 | -0.22206756 | -2.51591800 | 2.76790460 | -1.3117760 | 2.23892330 | 0.11500600 | -1.20915500 |
| 0.0872740 | 0.033554000 | -0.00144100 | -0.00144840 | 0.00257210 | 0.00258500 | -0.12732800 | 0.24182800 | 1.1654380 | 0.44806600 | 2.83322100 | 1.14115600 |
| 0.0045260 | 0.004549000 | -2.51349900 | 2.48657020 | -2.32309830 | 2.48366160 | -0.17467300 | 0.32204700 | -0.4022930 | 0.97488300 | -0.07502600 | 0.16233900 |
| 0.0000000 | 0.000000000 | 0.63928450 | -0.51940400 | 0.45827200 | -0.37624000 | -0.30273700 | -0.57047000 | 0.0000000 | 0.00000000 | 1.86084606 | 2.46941270 |
| 2.5059455 | -5.204071000 | 0.00000000 | 0.00000000 | 0.07988750 | 0.05689600 | 0.93281200 | -0.95154500 | 0.9756174 | -0.92883900 | -0.54409866 | -0.21943870 |
| -0.0047401 | -0.004764000 | -1.43215450 | 1.48429300 | -1.08462150 | 1.27835200 | 0.27744220 | 0.13521100 | 0.0081650 | 0.12715300 | -0.00428880 | -0.00431040 |
| -6.0677194 | -3.205421000 | 0.00000000 | 0.00000000 | -0.27308300 | -0.14362600 | 0.14384250 | 0.35453400 | -0.0127360 | -0.56307400 | -1.28310260 | 2.63200240 |
| 4.8852840 | 3.379951000 | 1.26238000 | -1.51147000 | 1.22435100 | -1.58231500 | -0.15830920 | -0.09166200 | 0.0246125 | -0.30771900 | 0.35391000 | -0.63352300 |
| 1.5344936 | 0.589953100 | -0.01230000 | -0.01632200 | 0.06255900 | 0.03402800 | -0.62374150 | -0.29466200 | -0.1189941 | 0.21025600 | -0.13195300 | -0.07004800 |
| 0.1684542 | -0.225539800 | 0.14456340 | -0.10606900 | 0.00823100 | -0.00089700 | 0.24937600 | 0.15971700 | 0.3823175 | 0.05914100 | 0.62884010 | -0.73649800 |
| -0.7566998 | -0.333195300 | 0.17108390 | 0.08895900 | 0.19863990 | 0.09730200 | -0.97351100 | 1.95375000 | 0.0001377 | 0.00013900 | -0.06817410 | -0.03168800 |
| 0.6689974 | 0.322890700 | 0.74744926 | 0.75121800 | 0.24239180 | -0.43731800 | 1.64025730 | -2.40297400 | 1.0732290 | -1.93769430 | 0.14583750 | -0.37439600 |
| 0.0110706 | -0.040063900 | 1.01749344 | -2.17212400 | 0.91521480 | -1.76028790 | 0.90119570 | -1.76968230 | -0.1640793 | -0.09399090 | 0.34108680 | 0.18822600 |
| 0.1080599 | 0.045075200 | -0.79473890 | -0.59926280 | -0.04848820 | 0.13350310 | -2.61825300 | -0.98591670 | -0.1305908 | 0.25166390 | 0.82067590 | -2.01336830 |
| -0.0098850 | 0.007315800 | -1.26683610 | -0.49350330 | -1.32550530 | -0.52226060 | 0.00002400 | 0.00002400 | -5.0309539 | -2.48586170 | -0.02068060 | 0.00116310 |
| -0.5109816 | -0.221773800 | -0.02408400 | 0.03026780 | -0.28932800 | -0.11960660 | 1.84707530 | 0.53430670 | 2.2121470 | 1.39765000 | 0.02218140 | 0.14962850 |
| 0.0087887 | -0.017583000 | -0.40089500 | -0.17105370 | 0.00002400 | 0.00002500 | 0.05843680 | -0.16169990 | 1.8841246 | 0.72437350 | -3.22145100 | -1.92548430 |
| 0.4962814 | 0.233713600 | 0.00002400 | 0.00002500 | 0.05509700 | -0.31510100 | -0.10622410 | -0.06090780 | 0.1717876 | -0.21624610 | 2.08576290 | 1.39299350 |
| -0.1817619 | 0.266577000 | 0.23867700 | -0.23379700 | 0.86802960 | 0.48048650 | -0.11143750 | 0.03812490 | -0.6937242 | -0.29514240 | -0.22450990 | -0.01839060 |
| -0.0134266 | -0.028117200 | 0.00451900 | -0.02345400 | -0.17627020 | -0.09619320 | 0.26686270 | 0.06518850 | -0.0087880 | 0.01758300 | 0.28220820 | -0.19516790 |
| -2.2332099 | -1.406524400 | 0.94963450 | 0.48430230 | 0.00109620 | 0.01026720 | -0.01107050 | 0.04006390 | 0.4310482 | 0.18267200 | 0.35690990 | 0.20032170 |
| -1.4986630 | -0.577620000 | -0.41739480 | -0.21032030 | -0.49410560 | -0.20721250 | -0.06373870 | -0.01613980 | 0.0011856 | -0.03274800 | -0.30732330 | -0.14886970 |
| 0.0000240 | 0.000025000 | -0.49135570 | -0.19408000 | 0.60860910 | 0.26809240 | 0.00200220 | 0.00201220 | 0.3814679 | 0.17509610 | -0.21524950 | -0.10841200 |
| 0.1805520 | -0.233854000 | 0.20448950 | 0.14321100 | -0.19050590 | 0.26265240 | -0.05695930 | 1.35996550 | -0.0011409 | 0.01124040 | 0.43709590 | 0.24009630 |
| 5.1942350 | 2.621104200 | 0.45722000 | 0.14487510 | 0.06297720 | 0.01746080 | 0.00000000 | 0.00000000 | -0.5867582 | -0.25401850 | 0.00105160 | 0.03177470 |
| -0.0053662 | -0.016138500 | -0.00002410 | -0.00002420 | -8.12023940 | -5.17782560 | -0.00202630 | -0.00203650 | -0.0056600 | 0.03469500 | 0.07493670 | 0.03019490 |

| LUMPINESS | ENTROPY | ACF1 | LSHIFT | VCHANGE | FSPOTS | LINEARITY | CURVATURE | SPIKINESS | KL SCORE | NAME |
|---|---|---|---|---|---|---|---|---|---|---|
| 3.0316559 | 0.9244481 | 0.4869793 | 0.68221631 | 0.547825642 | 54 | 0.747642706 | -5.1937767 | 3.260272e-04 | 51.754060 | X2.PCONE |
| 0.3483001 | 0.8152879 | 0.7406622 | 0.98220132 | 1.432587981 | 23 | 3.061817007 | -5.4333983 | 8.477538e-05 | 408.604353 | X2.PCTWO |
| 0.7063537 | 0.9118865 | 0.5526106 | 1.11699502 | 0.485229675 | 47 | -0.230644057 | -5.2445028 | 3.325266e-04 | 74.902188 | X3.PCONE |
| 2.3044927 | 0.9026043 | 0.4986370 | 0.76407406 | 0.307989001 | 28 | 2.098633854 | -3.1226967 | 2.143629e-04 | 320.173759 | X3.PCTWO |
| 1.3885894 | 0.8155832 | 0.7402561 | 0.47681361 | 0.254817146 | 51 | 1.640835886 | 2.1325588 | 3.361639e-04 | 229.575065 | X4.PCONE |
| 1.8732919 | 0.9271185 | 0.4654331 | 0.41753151 | 0.210819369 | 45 | 0.850246282 | -0.7309844 | 7.808993e-04 | 225.579043 | X4.PCTWO |
| 0.6413186 | 0.9541891 | 0.4460830 | 1.02017160 | 0.292497841 | 48 | -0.107545290 | -3.0693740 | 4.753397e-04 | 159.530032 | X5.PCONE |
| 1.0358783 | 0.9209500 | 0.4788657 | 0.81912713 | 0.188228545 | 44 | 0.793629299 | -2.4956587 | 8.300275e-04 | 291.643128 | X5.PCTWO |
| 0.5674515 | 0.9021606 | 0.7065616 | 2.17401609 | 1.249076351 | 53 | 0.587144731 | -6.1616857 | 1.138730e-04 | 47.965798 | X6.PCONE |
| 0.7184773 | 0.8318566 | 0.7263926 | 1.11093768 | 0.276509898 | 28 | 2.358924455 | -3.8416937 | 2.399412e-04 | 412.291658 | X6.PCTWO |
| 0.9729992 | 0.9120109 | 0.6625549 | 0.74294969 | 0.842432583 | 65 | 0.700702217 | -6.2014128 | 1.434873e-04 | 123.359056 | X7.PCONE |
| 1.2055520 | 0.9026832 | 0.5577377 | 1.20288391 | 0.527429132 | 27 | 0.210888342 | -4.3813310 | 2.586442e-04 | 619.093503 | X7.PCTWO |
| 0.9554332 | 0.9118156 | 0.5514052 | 0.74757168 | 0.366973168 | 52 | 0.111015781 | -4.2171787 | 3.190471e-04 | 102.318341 | X8.PCONE |
| 1.2239162 | 0.9223750 | 0.5593417 | 0.49854138 | 0.108621073 | 19 | 1.890835663 | -3.8080114 | 3.491471e-04 | 131.148488 | X8.PCTWO |
| 0.8229133 | 0.9075792 | 0.6306272 | 1.02827201 | 0.512773312 | 49 | -0.681226957 | -5.4029773 | 2.241094e-04 | 34.583689 | X9.PCONE |
| 2.7621742 | 0.8708699 | 0.6124665 | 0.67455884 | 0.204953233 | 47 | -0.506727812 | -3.3892532 | 2.538572e-04 | 292.175913 | X9.PCTWO |
| 1.4435424 | 0.9296991 | 0.5105426 | 1.27564468 | 0.806608478 | 49 | -0.237500138 | -6.0486719 | 3.305874e-04 | 17.055891 | X10.PCONE |
| 0.3869013 | 0.8777414 | 0.6525329 | 1.00944619 | 0.392762958 | 14 | 0.847671904 | -4.8696409 | 2.532275e-04 | 302.156438 | X10.PCTWO |
| 1.0094808 | 0.9054403 | 0.5485834 | 1.03138167 | 0.509252346 | 51 | -0.197903047 | -5.6882784 | 1.828580e-04 | 19.530205 | X11.PCONE |
| 0.2685091 | 0.7258095 | 0.8363646 | 1.46081359 | 1.481398399 | 51 | 0.042707268 | -5.2414753 | 5.022008e-05 | 42.085749 | X11.PCTWO |
| 0.5147932 | 0.9098880 | 0.5990927 | 1.08112155 | 1.755124861 | 47 | 0.898695378 | -5.3077610 | 1.751535e-04 | 20.077575 | X12.PCONE |
| 0.5991336 | 0.8613189 | 0.6295941 | 0.99978449 | 1.332293144 | 8 | 0.790935117 | -3.5211296 | 1.225305e-04 | 367.097994 | X12.PCTWO |
| 0.4665272 | 0.8819895 | 0.6159623 | 1.01630134 | 1.223744458 | 48 | 0.590959895 | -5.6095477 | 1.639522e-04 | 23.012331 | X13.PCONE |

FIG. 12

SYSTEM AND METHOD FOR MONITORING MACHINE ANOMALIES VIA CONTROL DATA

CROSS-REFERENCE TO RELATED APPLICATIONS

This application claims the benefit of U.S. Provisional Application Ser. No. 62/712,556 filed Jul. 31, 2018, the disclosure of which is incorporated herein by reference in its entirety.

BACKGROUND

Technical Field

Embodiments of the invention relate generally to product quality control and preventative maintenance in manufacturing processes, and more specifically, to a system and method for monitoring machine anomalies via control data.

Discussion of Art

In the machining space, it is generally important to detect when a machine is performing in an anomalous way, i.e., in a manner outside the normal and/or intended operating parameters/metrics of the machine, e.g., in a manner that may result in a defective part. It is, however, usually difficult to quantify what an anomaly actually is in a rigorous way, as benchmarks may vary from part to part. For example, several traditional systems and methods for detecting anomalies in a machine require operators to establish strict values for predetermined thresholds that a machine's operating parameters/metrics should fall between, with such systems raising an alarm when detected values fall outside the predetermined thresholds.

The disadvantages of such traditional systems are clear—manually determining and setting predetermined thresholds is an extremely manual process that typically requires reprogramming of a machine, and/or a corresponding monitoring system, whenever a tool change or a part change occurs due to the fact that different processes have different tolerances and/or fundamentally different manufacturing profiles.

What is needed, therefore, is an improved system and method for monitoring machine anomalies via control data.

BRIEF DESCRIPTION

In an embodiment, a system for monitoring machine anomalies via control data is provided. The system includes one or more sensors operative to generate control data from a machine, and a controller in electronic communication with the one or more sensors. The controller is operative to: receive the control data from the one or more sensors; generate a latent structure of part signatures from the control data; identify an anomaly within the latent structure of part signatures; and generate an indictor conveying the anomaly.

In another embodiment, a method for monitoring machine anomalies via control data is provided. The method includes generating control data via one or more sensors from a machine, and receiving the control data at a controller in electronic communication with the one or more sensors. The method further includes generating a latent structure of part signatures from the control data via the controller, identifying an anomaly within the latent structure of part signatures via the controller, and generating an indicator conveying the anomaly via the controller.

In yet another embodiment, a non-transitory computer readable medium storing instructions is provided. The stored instructions adapt a controller to: receive control data generated by one or more sensors from a machine; generate a latent structure of part signatures from the control data; identify an anomaly within the latent structure of part signatures; and generate an indictor conveying the anomaly.

DRAWINGS

The present invention will be better understood from reading the following description of non-limiting embodiments, with reference to the attached drawings, wherein below:

Figure 1:
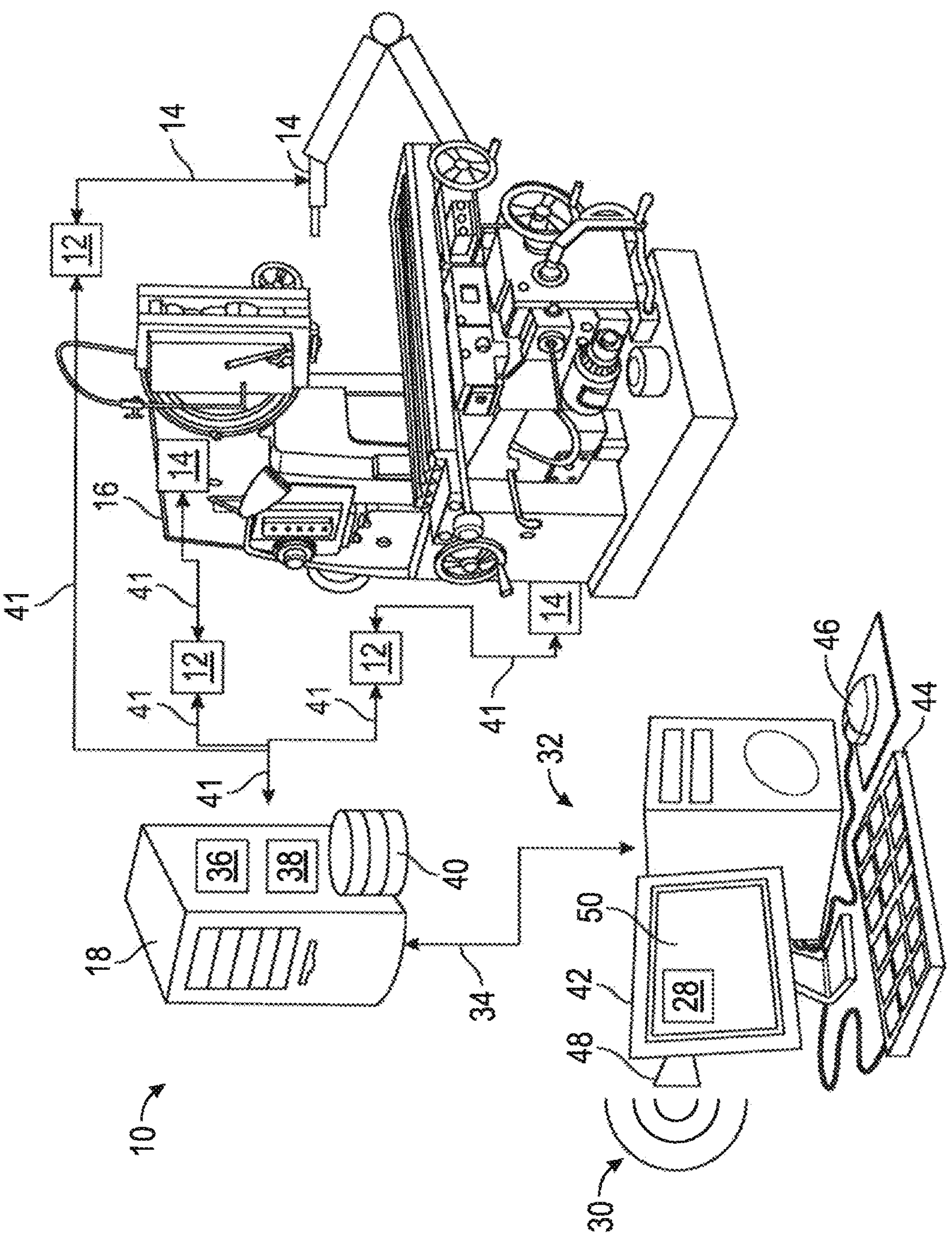
FIG. 1 is a diagram of a system for monitoring machine anomalies via control data, in accordance with an embodiment of the present invention.
Figure 4A:
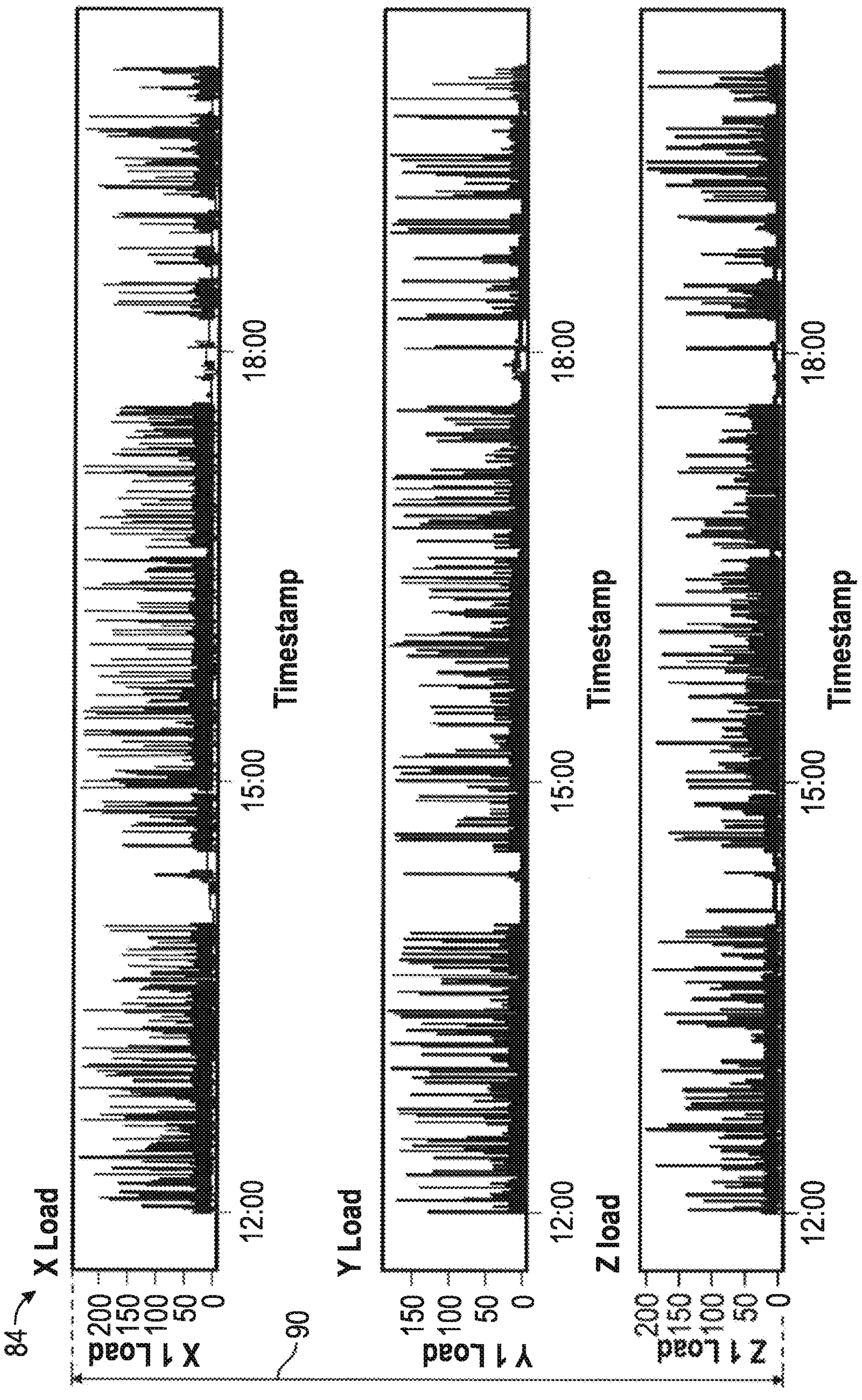
Figure 4B:
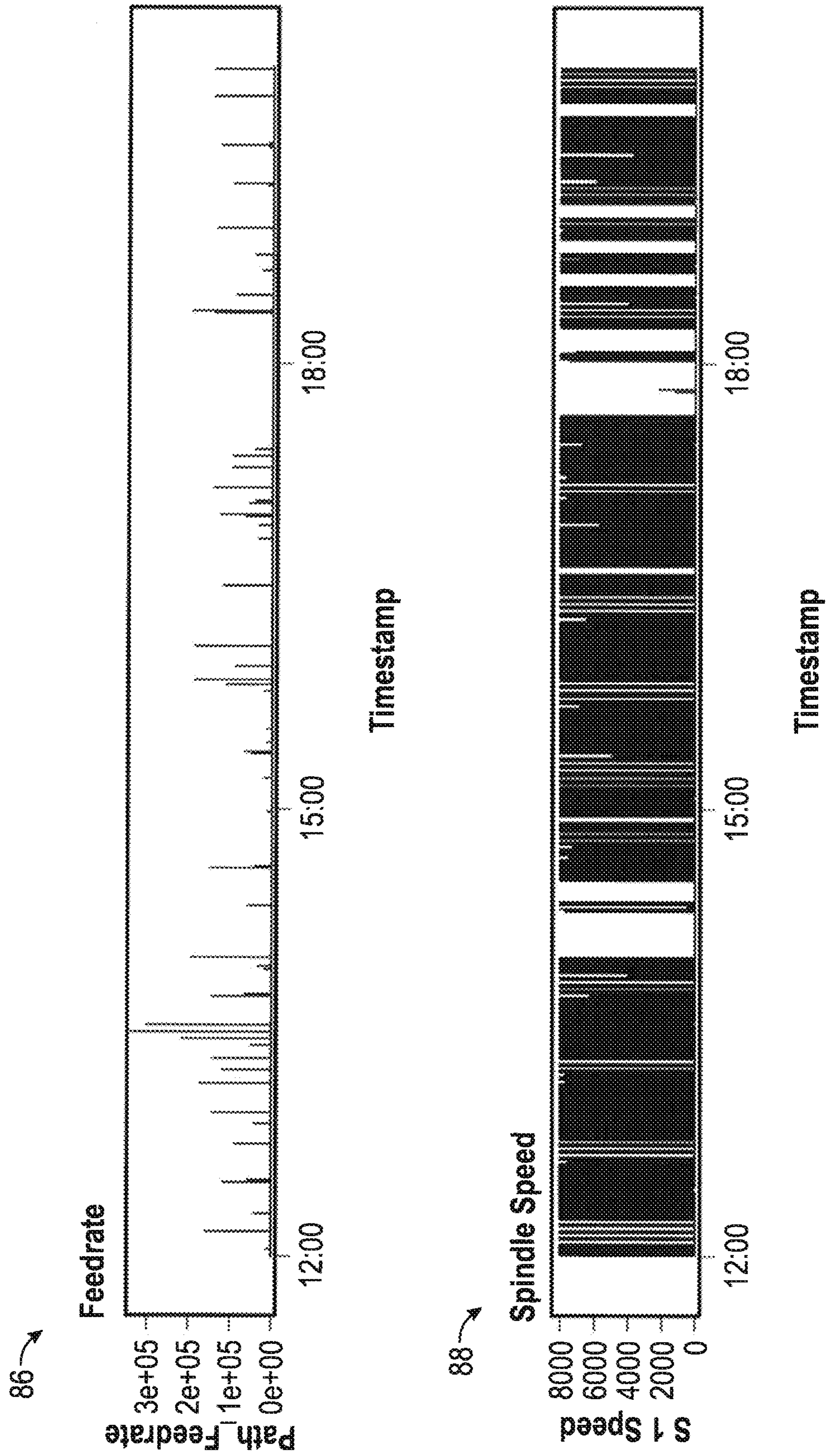
Figure 5A:
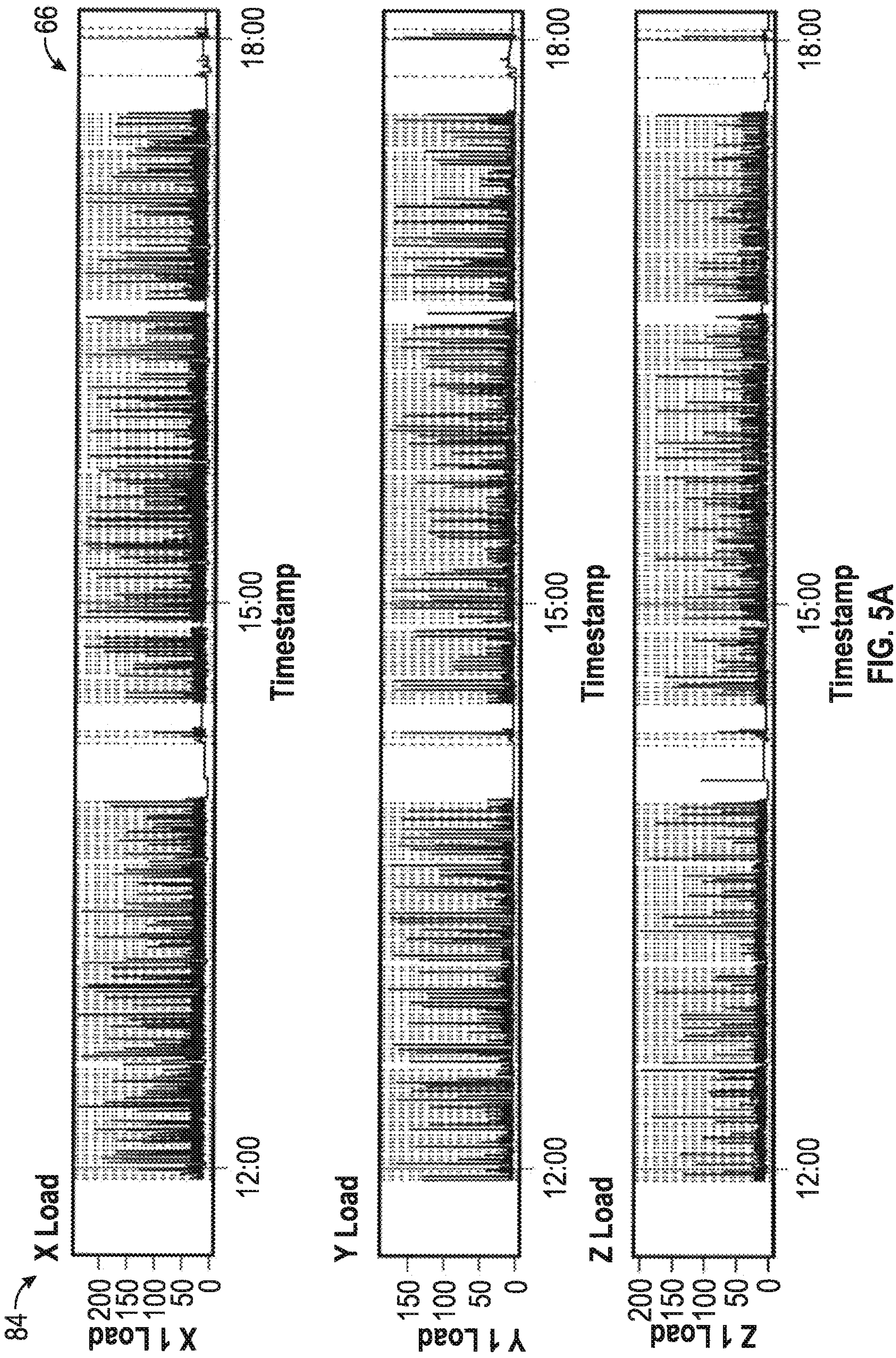
Figure 5B:
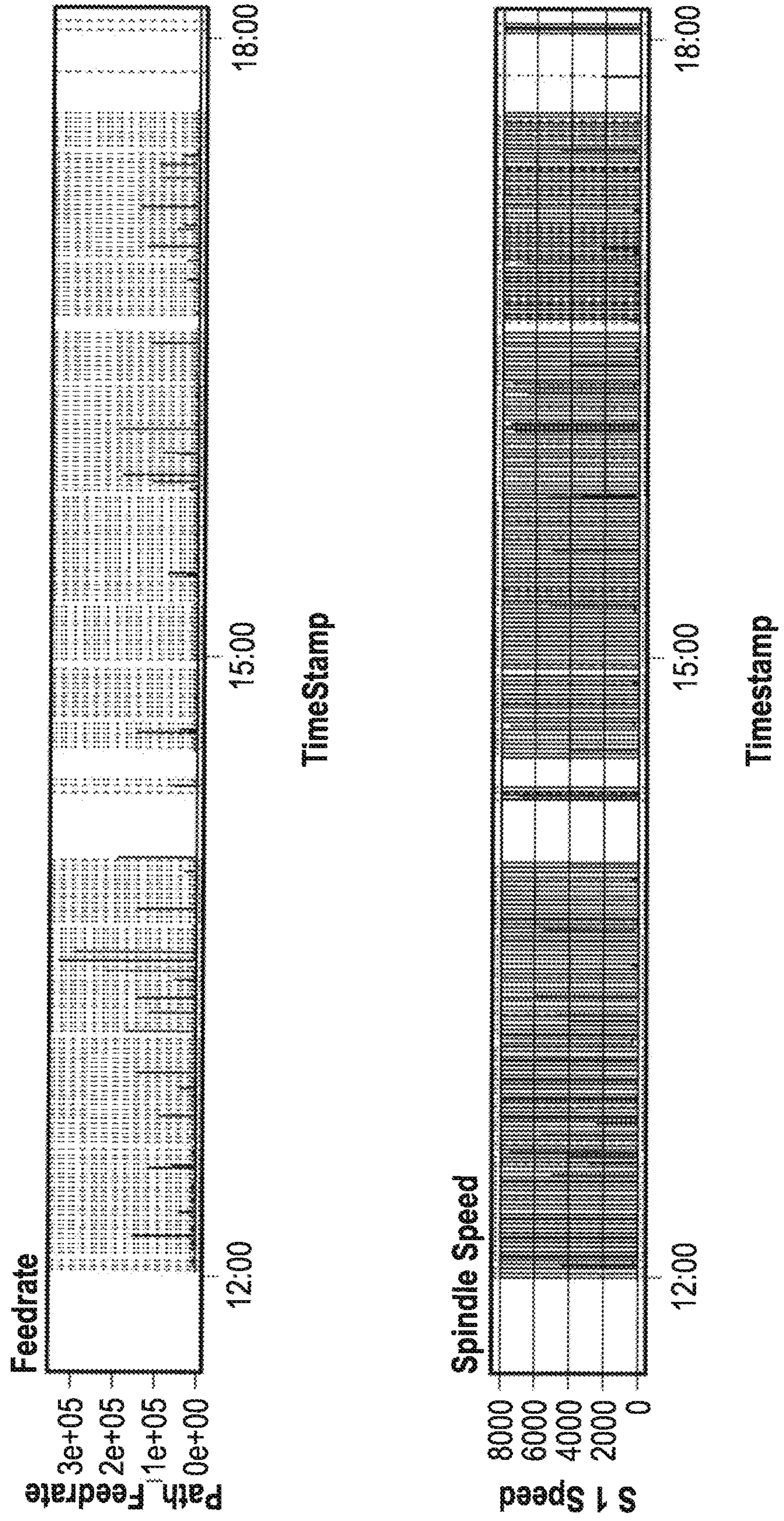
Figure 7:
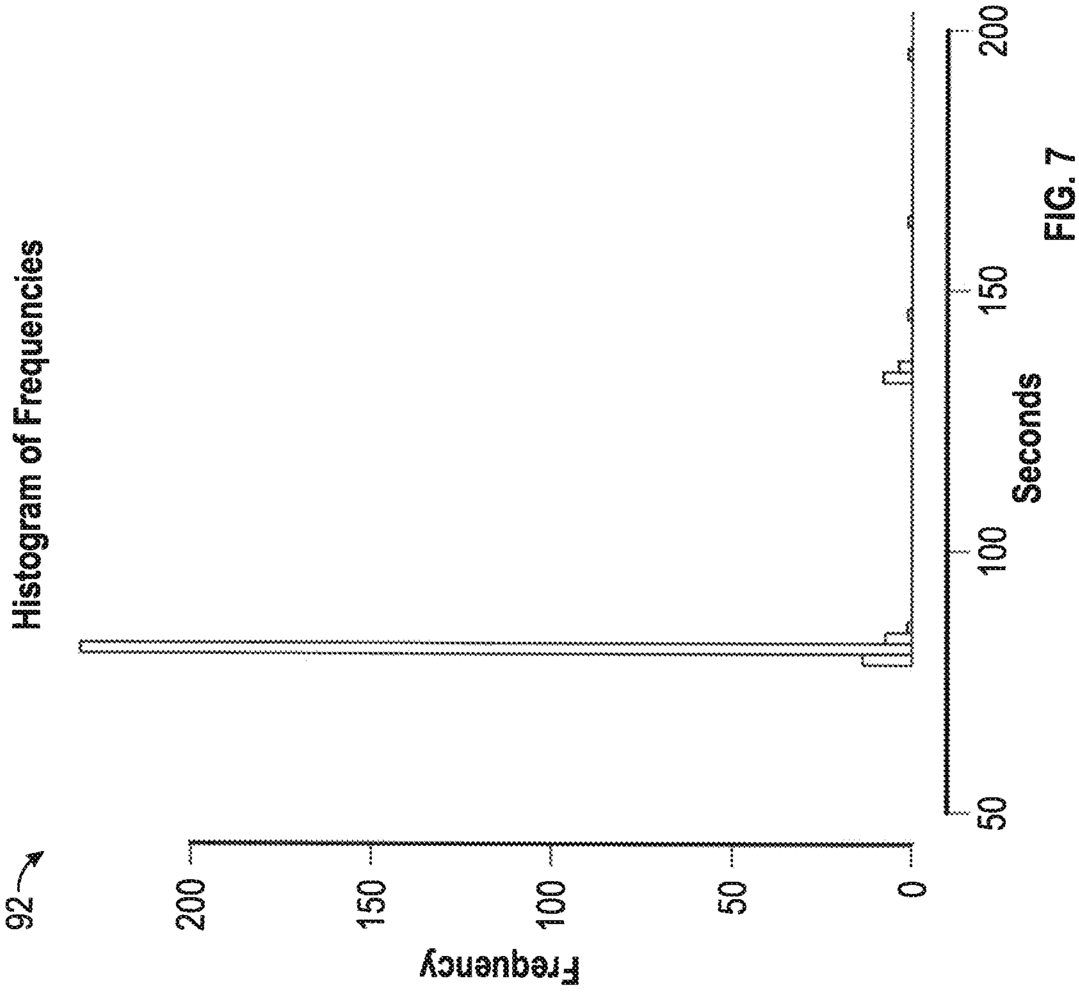
Figure 8A:
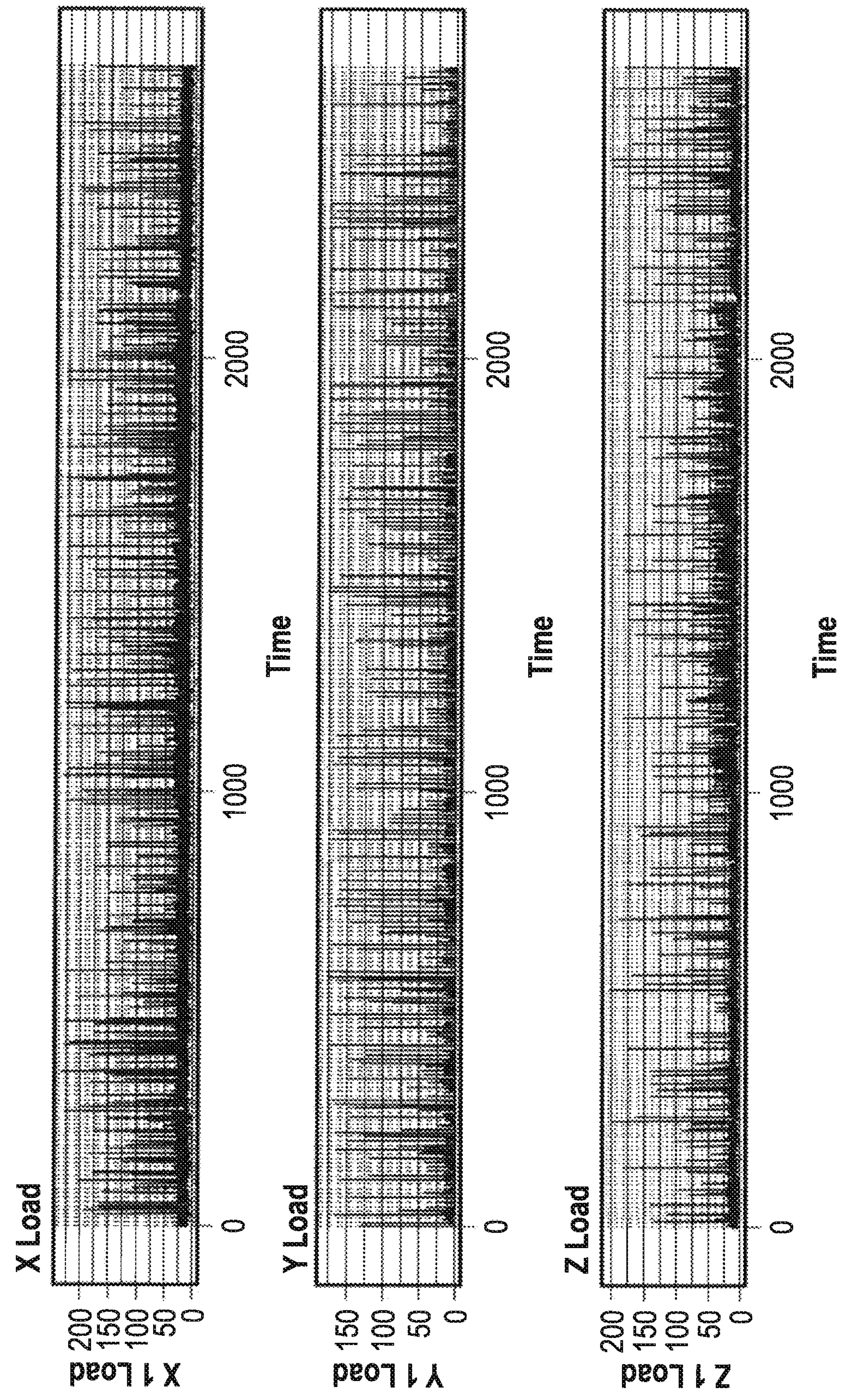
Figure 8B:
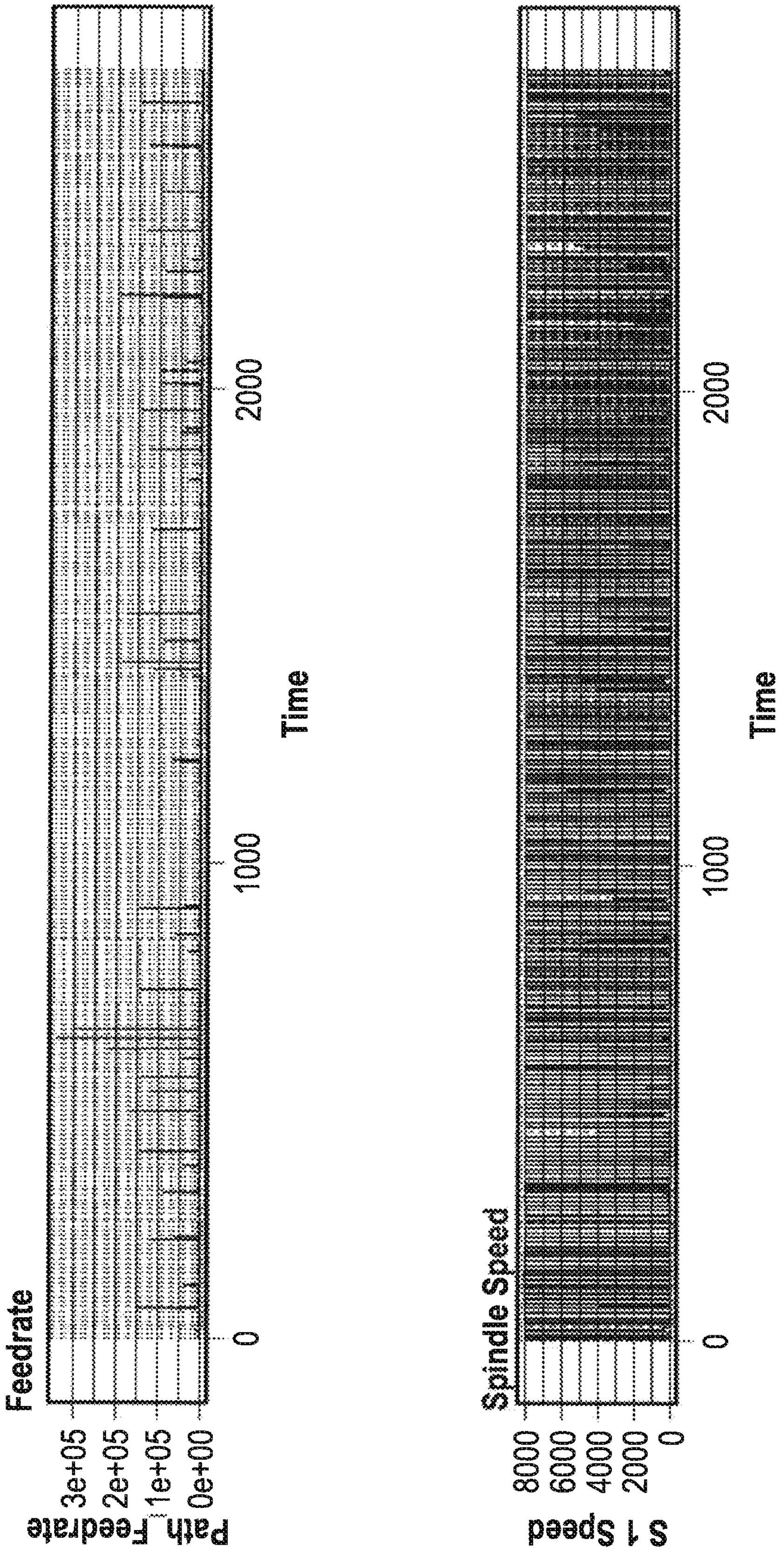
Figure 10:
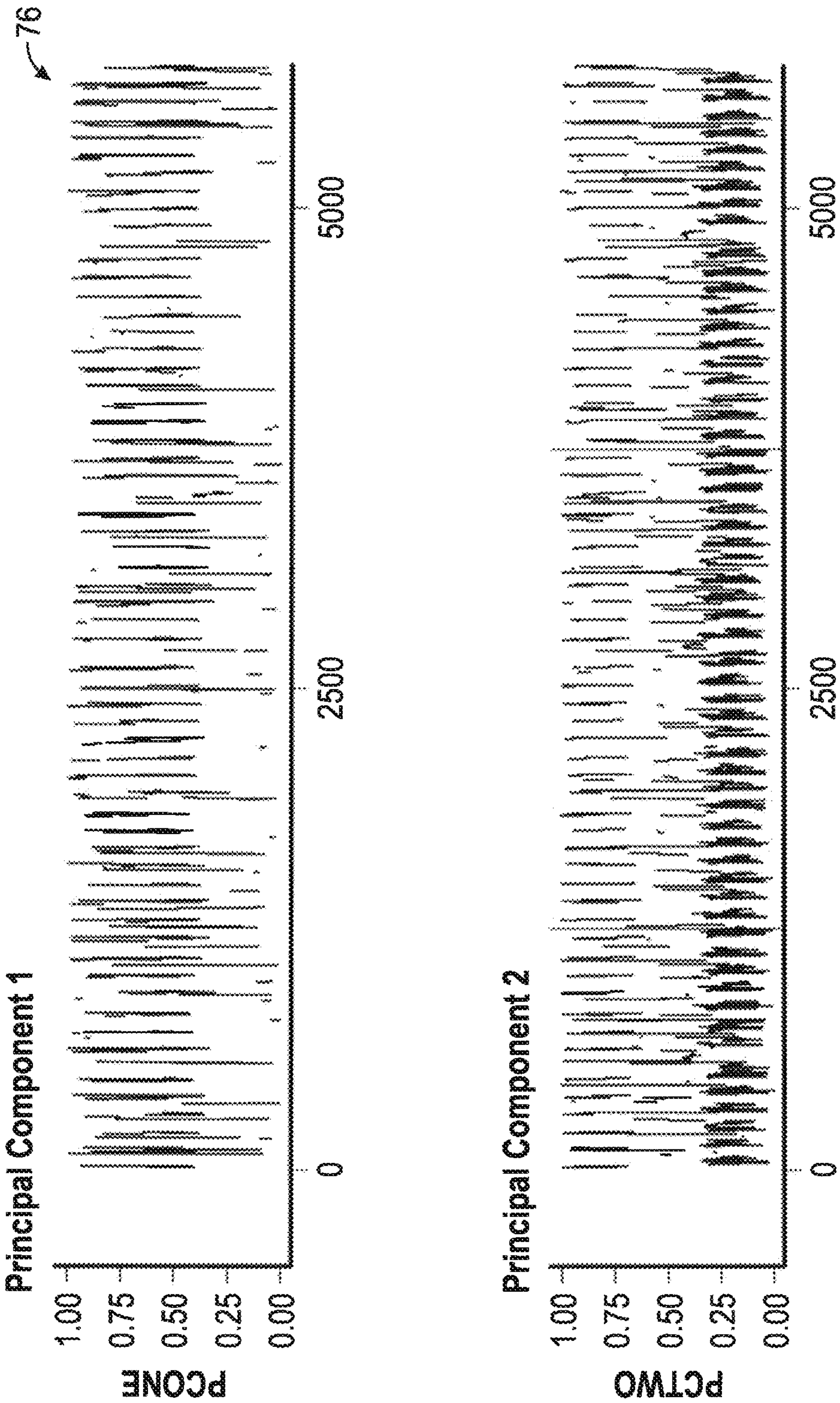
Figure 13:
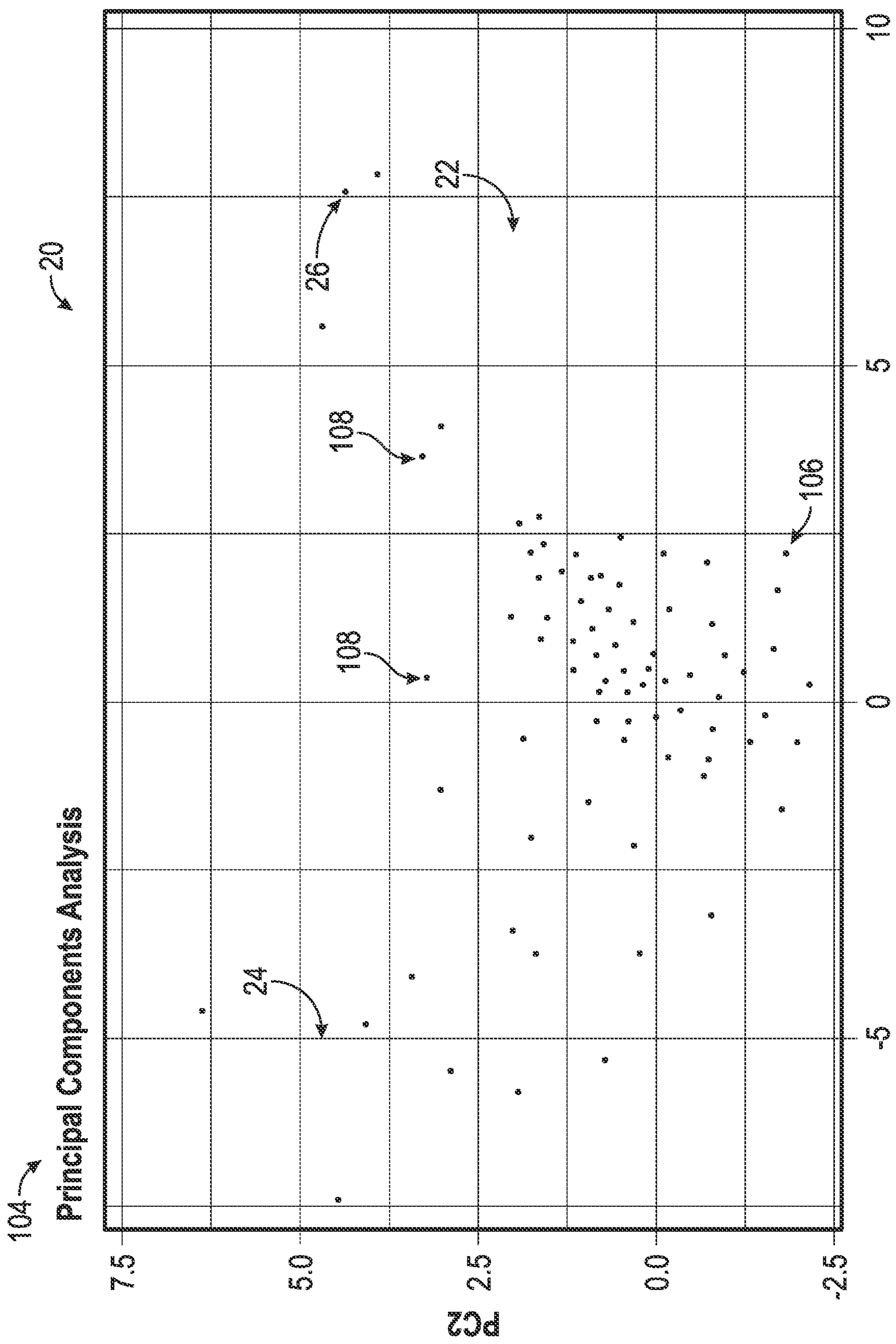
Figure 14A:
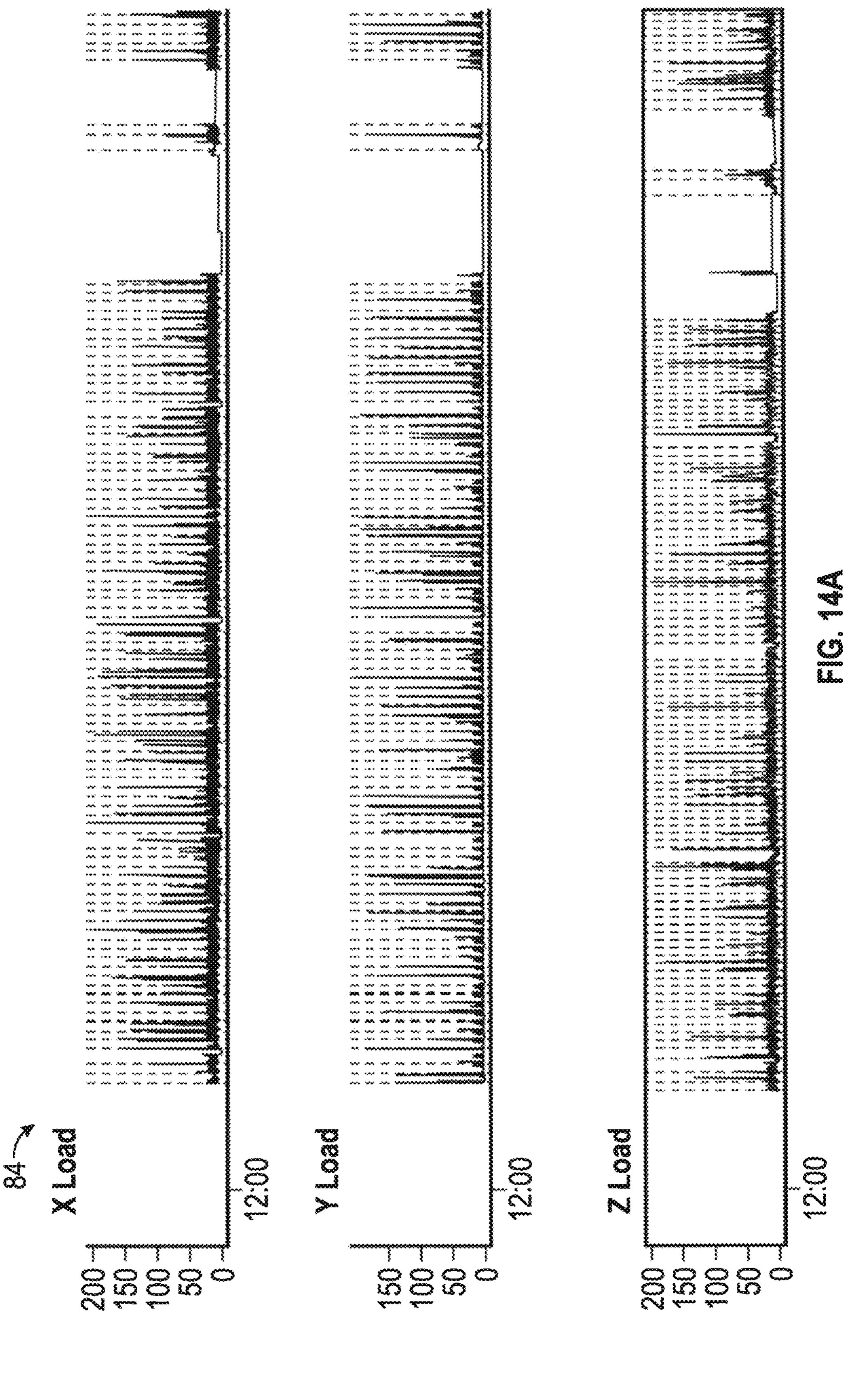
Figure 14B:
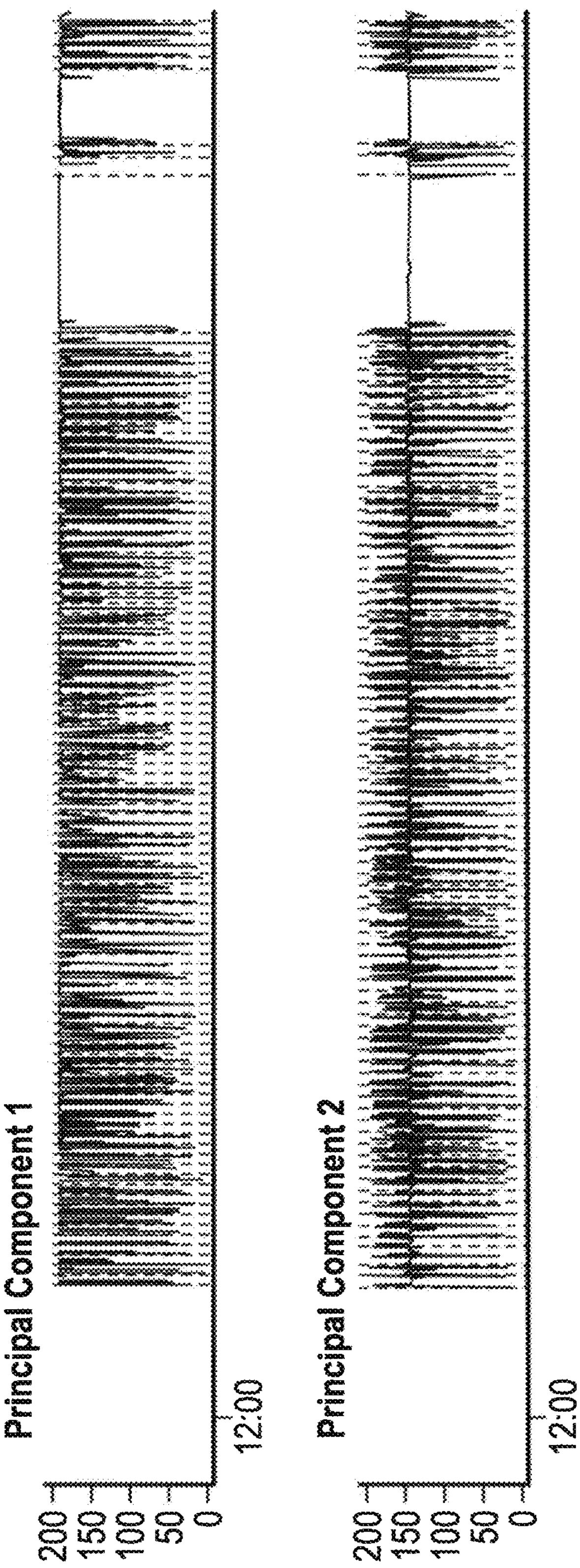
Figure 15:
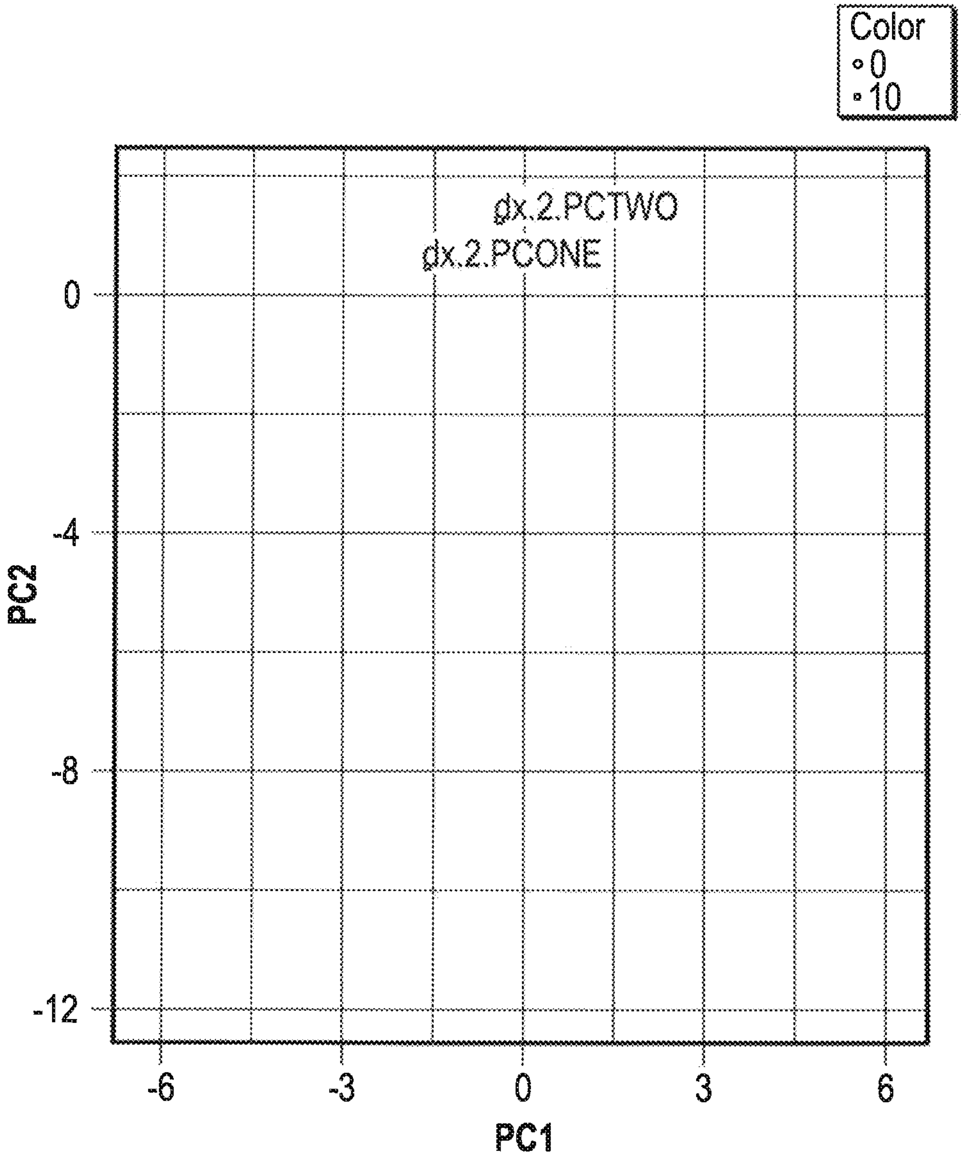

FIGS. 4A-4B, collectively referred to herein as FIG. 4, are a visualization of control data, in accordance with an embodiment of the present invention;

FIGS. 5A-5B, collectively referred to herein as FIG. 5, are another visualization of the control data of FIG. 4, wherein part count identifiers have been superimposed onto the control data, in accordance with an embodiment of the present invention;

FIG. 6 is a table of time distances between the part count identifiers of FIG. 5, in accordance with an embodiment of the present invention;

FIG. 7 is a diagram of a histogram and a corresponding table of the time distances of FIG. 6, in accordance with an embodiment of the present invention;

FIGS. 8A-8B, collectively referred to herein as FIG. 8, are diagrams depicting isolated part signatures of the control data of FIG. 4, in accordance with an embodiment of the present invention;

FIG. 9 is a diagram of latent signals of the control data of FIG. 4, in accordance with an embodiment of the present invention;

FIG. 10 is a plot of the latent signals of FIG. 9, in accordance with an embodiment of the present invention;

FIG. 11 is a table depicting a transformation of the isolated part signatures of FIG. 8, in accordance with an embodiment of the present invention;

FIG. 12 is a table depicting Rob Hyndman's Anomalous metrics of the control data of FIG. 1, in accordance with an embodiment of the present invention;

FIG. 13 is a graphical plot of part signatures of the control data of FIG. 1, in accordance with an embodiment of the present invention;

FIGS. 14A-14B, collectively referred to herein as FIG. 14, are another visualization of the control data of FIG. 4, wherein detected anomalies have been superimposed onto the control data, in accordance with an embodiment of the present invention; and FIG. 15 is another graphical plot of part signatures of the control data of FIG. 1, in accordance with an embodiment of the present invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time", as used herein means a level of processing responsiveness that a user senses as sufficiently immediate or that enables the processor to keep up with an external process. As used herein, the term "control data" means any type of data which governs the behavior of a machine, e.g., speed data, feed rate data, load data.

As will be explained in greater detail below, the present invention provides for an automated approach to detecting anomalies in machines, which in some embodiments, may be facilitated via machine learning. In other words, some embodiments of the present invention provide an unsupervised self-learning approach to tell when a machine is inherently in a different state as compared to an established baseline. As used herein with respect to machine learning, the term "unsupervised" means a machine learning algorithm that does not require labeled data and/or human intervention to find structure in a dataset. Through such intelligent algorithms, embodiments of the present invention infer the organization of data, and construct problem models independent of human supervision. As will be appreciated, by applying the unsupervised learning approaches described herein to the machining industry, some embodiments of the present invention reduce the need for humans to constantly monitor and/or oversee certain manufacturing/machining processes. In particular, some embodiments of the present invention learn what the relevant parameter thresholds for a particular process/operation should be, which in turn, provides for customized requirements for each and every part being machined/manufactured. In other words, at a high level, some embodiments of the present invention measure the intrinsic qualities of what a machine is doing while making a part, and algorithmically computer an acceptable range for parameter thresholds governing that machining process. Accordingly, when the machine's intrinsic signature falls outside the pre-determined range, embodiments of the present invention will raise/generate an indicator/alarm.

Thus, as will be appreciated, embodiments of the present invention use domain knowledge, machine learning, to facilitate new ways of looking at control data to break down a machining task/process into smaller pieces in order to autonomously monitor machine anomalies.

Further, while the embodiments disclosed herein are described with respect to the machining industry, it is to be understood that embodiments of the present invention may be applicable to other fields/systems/processes in which a device is subjected to repetitive stresses that may detrimentally affect end product quality.

Referring now to FIG. 1, the major components of a system 10 for monitoring machine anomalies via control data 12, in accordance with an embodiment of the present invention, are shown. The system 10 includes one or more sensors 14 operative to generate the control data 12 from a machine 16, and a controller 18 in electronic communication with the one or more sensors 14. As will be explained in greater detail below, the controller 18 is operative to: receive the control data 12 from the one or more sensors 14; generate a latent structure 20 of part signatures 22 from the control data 12; and identify an anomaly 24 and 26 (FIG. 13); and generate an indicator 28 and 30 conveying the anomaly 24 and 26. The system 10 may further include one or more computerized workstations 32, which, in embodiments, may be in electronic communication with the controller 18 via one or more communication link 34, e.g., a wired connection such as ethernet, USB, serial or other suitable wired connection; and/or a wireless connection such as WiFi, cellular, or other suitable wireless connection.

The machine 16 may be any type of manufacturing device operative to generate/process a plurality of parts in a repetitive manner, e.g., a press, drill, saw, etc. The machine 16 may have one or more operating parameters/metrics such as load, speeds, feed rates, etc.

The one or more sensors 14 may include load sensors, speed sensors, feed rate sensors, etc. In embodiments, the one or more sensors 14 may be embedded/integrated into the machine 16, disposed on external surfaces of the machine, and/or disposed at a distance from the machine 16. The one or more sensors 14 may be mechanical, e.g., a spring based load sensors, magnetic, e.g., a rotational pickup, optical, e.g., lasers, or other types of sensors that are operative to detect/sense control data 12 from the machine 16. In other words, the one or more sensors 14 may be any type of sensor that provides data concerning an operating parameter of the machine 16 used to control operation of the machine 16. For example, in embodiments, the one or more sensors 14 may be internal to the machine 16 and necessary for operation of the machine 16.

In embodiments, the one or more sensors 14 may further include a part counter, i.e., a device that detects when the machine 16 has finished processing/generating a part and/or tracks the number of parts made by the machine.

The controller 18 includes at least one processor 36 and a memory device 38. For example, in embodiments, the controller 18 may be a dedicated process logic controller ("PLC") or a general purpose computer such as a desktop/laptop. The controller 18 may include, and/or electronically communicate with, a database 40 that stores the control data 12. The controller 18 may be at the same site/location as the machine 16, or in embodiments, located at a different site from the machine 16. The controller 16 may electronically communicate with the one or more sensors 14 via communication link 41 which, like link 34, may be wired and/or wireless.

The workstation 32 may include a monitor 42, keyboard 44, mouse 46, speaker 48 and/or other human machine interface ("HMI") devices. The workstation 32 may provide for a graphical user interface ("GUI") 50 that facilitates interaction between an operator, e.g., a human and/or computer user, i.e., a "bot", and the system 10 and/or machine 16.

As shown in FIG. 1, in embodiments, the indictor may be a graphical indicator 28, e.g., a GUI 50 text box, light, etc., and/or an audio indicator 30 sounded by the speaker 48 or other suitable device. In embodiments, the indicator 28, 30 may be an e-mail, sms, and/or other electronic message. Further, while FIG. 1 depicts the controller 18 and workstation 32 as apart from the machine 16, in embodiments, the controller 18 and/or workstation 32 may be integrated into the machine 16. Accordingly, in embodiments, the system 10 may further include the machine 16.

Figure 2:
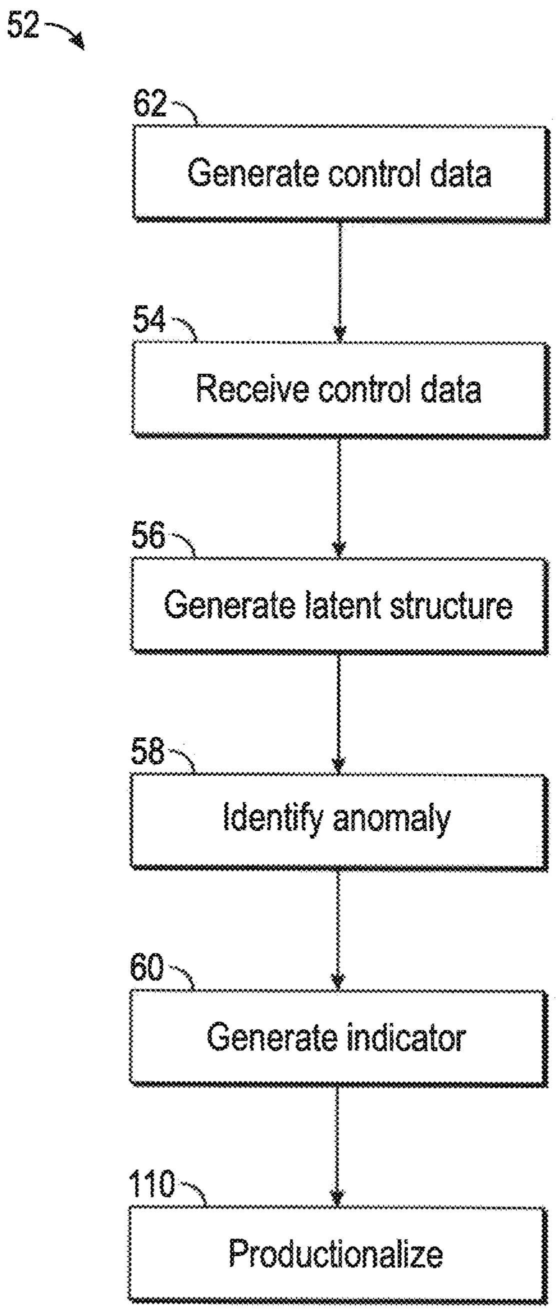
FIG. 2 is a flow chart depicting a method for monitoring machine anomalies via control data, in accordance with an embodiment of the present invention.

Turning now to FIG. 2, a method 52 for monitoring machine anomalies via control data utilizing the system 10, in accordance with an embodiment of the present invention, is shown. The method 52 includes: receiving 54 the control data 12 at the controller 18; generating 56 the latent structure 20 (FIG. 13) of part signatures 22 (FIG. 13) from the control data 12 via the controller 18; identifying 58 the anomaly 24, 26 within the latent structure 20 of part signatures 22 via the controller 18; and/or generating 60 the indicator 28, 30 via the controller 18. In embodiments, the method 52 may further include generating 62 the control data 12 via the one or more sensors 14 from the machine 16.

Figure 3:
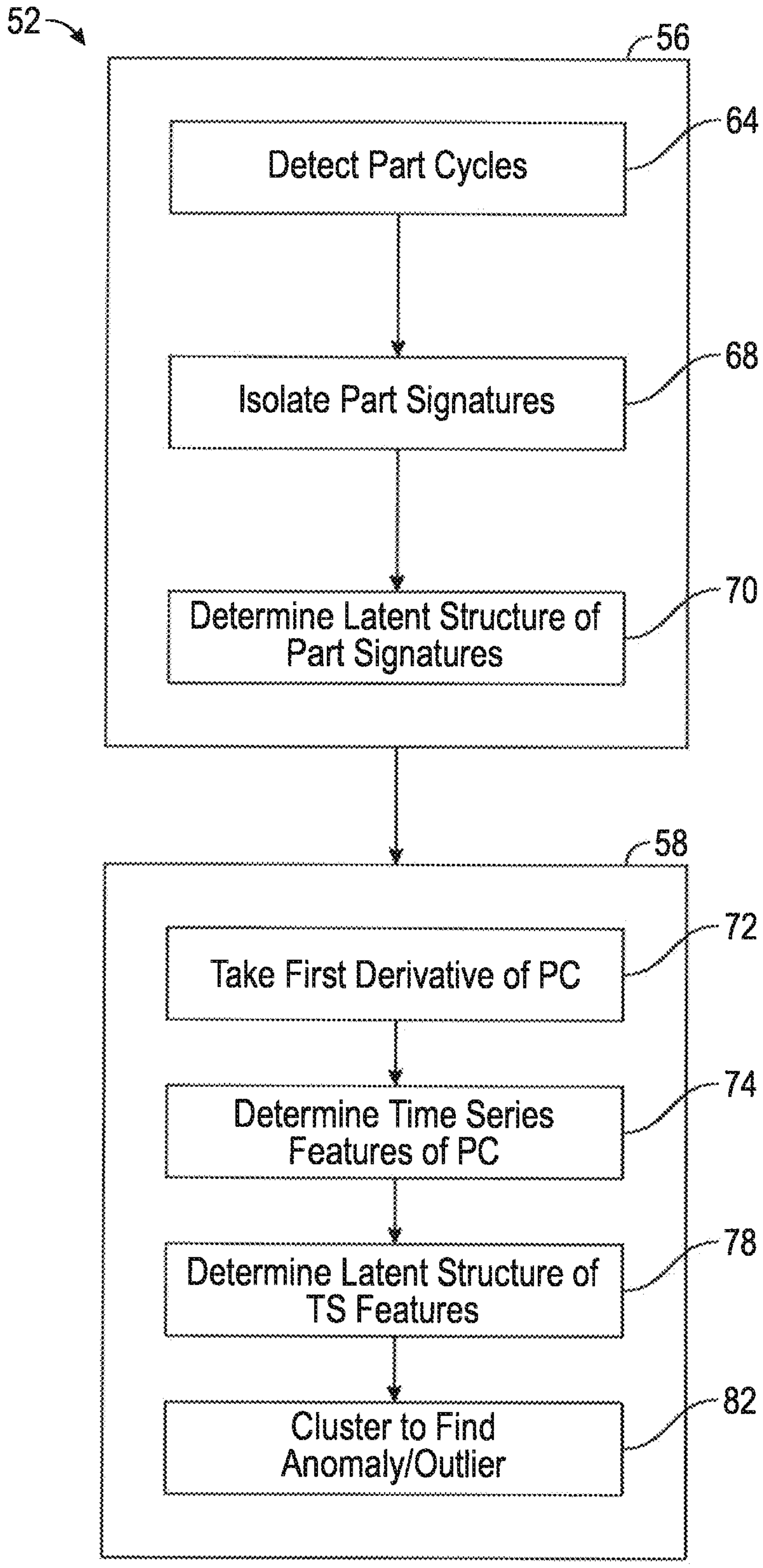
FIG. 3 is another flow chart depicting the method of FIG. 2, in accordance with an embodiment of the present invention.

As shown in FIG. 3, generating 56 the latent structure 20 of part signatures 22 may include: detecting 64 part cycles 66 (FIG. 5) within the control data 12; isolating 68 part signatures 22 from the part cycles 68; and/or generating/determining 70 the latent structure 20 of part signatures 22 based at least in part on the isolated 68 part signatures 22. As also shown in FIG. 3, identifying 58 the anomaly 24, 26 within the latent structure 20 of part signatures 22 may include: transforming 72 the latent structure 20 of part signatures 22; determining/generating 74 time series features of part components ("PCs") 76 (FIG. 10) of the transformed 72 latent structure 20 of part signatures 22; determining/generating 78 the latent structure 20 from the generated 74 PCs 76; and/or clustering 82 the part signatures 22.

Referring now to FIG. 4, a visualization 84 of a machining process for a given part, in accordance with an embodiment of the present invention, is shown. The visualization 84 shows plots between twelve (12) PM and ten (10) PM of feeds 86, speeds 88, and loads 90 of the machine 16 (FIG. 1) while repetitively manufacturing one unique part. As will be understood, feeds 86, speeds 88, and loads 90 are parameters of the machine 16 that may be indicative of the health of the machine 16 and/or the associated machining process.

As shown in FIG. 4, the data may be quite noisy, i.e., it may be difficult for a human to detect portions of the data relevant to anomalies. Further, as stated above, a human may not even know what types of structures/patterns within the data correspond to anomalies. Mixed in with the data shown in FIG. 4 is downtime, which may be created by both events which are: human-based, e.g., bathroom breaks, changing over a bar being fed into a machine; and/or machine-based, e.g., built-in resting times, tool changes, and as in the depicted scenario, a catastrophic fault. As can be seen in FIG. 4, without a structure and/or logic to base an analysis off of, it is very difficult for a human, and most traditional machines/computers, to understand how to proceed. Accordingly, embodiments of the present invention solve the aforementioned problem by leveraging domain knowledge of manufacturing, e.g., determine/identify when parts are created and/or how long it takes to make a part. For example, it is not statistically important that there may have been a five (5) minute water break during the twelve (12) PM and ten (10) PM operational period/span; and, as such, the controller 18 (FIG. 1) should not detect such a break as an anomaly.

Accordingly, the controller 18 may filter out the signal, i.e., the time the machine 16 is actually doing work/making a part, from noise, i.e., when the machine is not in the process of making a part, while not excluding truly anomalous behavior from the data. Thus, embedded within the anomaly detection problem is the problem of determining what data to keep and what data to discard. As will be appreciated, embodiments of the present invention solve this problem by collecting a part count field, which may be acquired by the one or more sensors 14 and included in the control data 12, that indicates when a part is created, how many parts have been made, and/or how long it took to make each part.

Accordingly, FIG. 5 depicts the visualization 84 with part counts superimposed, e.g., each dotted line in FIG. 5 represents the creation of one part. As can be seen, the dotted lines may be spaced out at uneven intervals. In other words, parts may not be made by the machine 16 on a regular cycle and/or part creation may be interrupted by various other things, e.g., breaks, during a working shift. As will be appreciated, however, the majority of dotted lines have a consistent distance from each other. Thus, by extension, the controller 18, in embodiments, determines an ideal cycle time by creating a histogram 92 (FIG. 7) of distances between dotted lines, with the assumption that the most frequent distance will be the ideal cycle time.

For example, moving to FIG. 6, the controller 18 may extract all times when the part count is incremented, which as will be understood, represent the dotted lines in FIG. 5. The controller 18 may then compute the distance from each timestep to the next, which in embodiments, may be in seconds (s). As shown in FIG. 6, the majority of the distances, i.e., the time from the previous part creation, for the shown time span are around eighty-one (81) or eighty-two (82) seconds, with one distance being one-hundred-and-thirty-four (134) seconds (which may have been caused by a built in break, e.g., having to load more raw material into the machine 16 (FIG. 1)).

Turning to FIG. 7, as stated above, the controller 18 may generate the histogram 92 of the distances (FIG. 6), and/or an accompanying table 94, to identify the distribution of cycle times. As will be understood, the count column in table 94 indicates the number of instances in the time span where the corresponding cycle time occurred. As clearly shown by the histogram 92 and table 94, eighty-one (81) to eighty-two (82) seconds is the real cycle time, with other times being influenced by stoppages. In embodiments, the controller 18 may use the top most frequent distance, e.g., eighty-two (82), as the ideal cycle time. As will be appreciated, using this approach, the controller 18 can algorithmically determine the ideal cycle time for any part over any time span.

Referring now to FIG. 8, once the ideal cycle time has been determined, the controller 18 may then create spans of time when the machine 16 (FIG. 1) is actually in operation. For example, in embodiments, the controller 18 may subtract the ideal cycle time from each dotted line in the visualization 84 (FIG. 5), and preserve the resulting time spans. In other words, all spans of time which do not fall within a sub-time-span of (dotted line—ideal cycle time) are discarded. Thus, as can be seen in FIG. 8, the signal appears in a much clearer/cleaner form, e.g., resembling typical signal data such as vibration, speech, and/or power.

With the signal in a cleaner form, the controller 18 may then proceed to learn which variations in the data are likely to be indicative of anomalies. For example, in certain machining processes, it may not be relevant if loads, speeds, and feed rate all fall to zero (0) at the same time, which, as will be appreciated, may simply indicate that the machine 16 (FIG. 1) is resting. A problem/anomaly may exist, however, if the machine 16 continues to feed material with the loads falling to zero (0). As will be appreciated, embodiments of the method 54 solve this problem by using meaningful ways to measure the correlations and/or relationships between all signals, and then distill them into one or two combined signals. For example, in embodiments, the combined signals may encompass all loads, feeds, and speeds.

Accordingly, some embodiments of the present invention may distill the signals, e.g., loads, feeds, and speeds, via Principal Component Analysis ("PCA"). As will be understood, PCA takes a multi-dimensional matrix and distills it into its PCs by capturing the direction of most variance. For example, if seventy percent (70%) of the variance of a data set can be captured in one dimension, and ninety-five percent (95%) can be captured in two dimensions, only five percent (5%) of the information in the data is lost by eliminating all other variables. The method used by PCA, in the present invention, to identify these latent dimensions involves taking the eigenvalues from the covariance matrix between all variables, and then taking the highest eigenvalues as the dimensions to be kept. Intuitively, PCA keeps the combinations of the variables that can represent the data the best. Thus meaning can often be derived from the combined variables as the implied information underpinning them.

As shown in FIG. 9, in embodiments, the multi-dimensional matrix 96 may be the collection of all feeds, speeds, and loads, e.g., eight (8), variables. The controller 18 may then use PCA to reduce these variables into one or more PCs 98 which capture the vast majority of the information contained by the variables. Additionally, in some embodiments, the controller 18 may identify decouplings of relationships by combining the variables into two PCs, as the values in the principal signal will be sensitive to unusual relationships arising between the original variables. A plot (FIG. 10) of the generated/determined/found latent signals, e.g., PC1 and PC2, shows an approximately consistent signal, especially with respect to PC2.

Accordingly, in embodiments, as part of isolating 68 (FIG. 3) the part signatures, the controller 18 may split up the entire stream of events into individual components, i.e., the part machining signatures. As will be understood, each part machining signature represents one part being made and the corresponding variables, e.g., feeds, speeds, and loads, which are attached/correspond to the part. For example, a particular time span/operational period may have two-hundred-and-seventy-eight (278) made parts, resulting in five-hundred-and-fifty-six (556), e.g., (278*2 PCs), unique part signatures. The controller 18 may then take each part signature and line them up next to each other so as to create a table.

The controller 18 may then further generate hundreds of more variables by taking transformations of each of the original part signatures. In embodiments, the controller 18 may transform the original part signatures via taking the log of the values, taking the rate of change, and/or by calculating the rolling mean and/or rolling standard deviations. As will be appreciated, each of the foregoing transformations provides a different view of the data/signal, which may result in a variety of ways to isolate anomalies. For example, anomalies may not be detectable in the raw data/signal, but may be obvious in a transformed plane. Accordingly, shown in FIG. 11 is a chart 100 depicting a portion of two-thousand-seven-hundred-and-eighty (2780) total variables generated by the controller 18 by multiplying the above five-hundred-fifty-six (556) part signatures over four (4) transformations. As will be appreciated, each column in chart 100 represents an individual part machining signature component.

As will be understood, in embodiments, each the raw value of each part signature may be too volatile to be compared against each other, even after having been smoothed via rolling averages. Thus, in embodiments, determining 70 (FIG. 3) the latent structure 20 of part signatures 22 may be based at least in part on one or more of the following Rob Hyndman "Anomalous" metrics listed in Table 1 below, which generates the chart 102 shown in FIG. 12, in which each part signature is distilled down into ten (10) characteristics and represented on one (1) row. As will be appreciated, in embodiments, the controller 18 detects anomalies based at least in part on the attributes of chart 102.

TABLE 1

| | |
|---|---|
| Lumpiness | measure of how "spurty" the series is |
| Entropy | measure of chaos and predictability of the series |
| ACF1 | first order autocorrelation |
| Lshift | level shift using a rolling window |
| Vchange | variance change |
| Fspots | flat spots using discretization |
| Linearity | strength of linearity |
| Curvature | strength of curvature |
| Spikiness | strength of spikiness |
| KLscore | Kullback-Leibler score |

Moving to FIG. 13, in embodiments, once the above Rob Hyndman "Anomalous" metrics have been generated, the controller 18 may project the latent features onto a two-dimensional ("2D") and/or three-dimensional ("3D") plane 104 via. PCA. The controller 18 may split up the metrics by each type of applied transformation and apply PCA to the resulting data. For example, the controller 18 may distill ten (10) attributes/metrics down into two (2) PCs, and the plot the PCs in a 2D scatterplot. As can be seen in FIG. 13, merely "eyeballing" the depicted plot 104 reveals a central cluster 106 of part signatures, with some scattered part signatures 108 on the outskirts, and with some part signatures 24, 26 "way far off". As will be understood, the "way far off" part signatures 24, 26 are the anomalies.

In many scenarios, in accordance with embodiments of the present invention, taking the first order derivative is often the most effective in 2D PCA space, transformation type for detecting anomalies, i.e., the best at separating out anomalies from the other part signatures, as the first derivative normalizes the series and/or largely removes any auto-correlative factors. Taking the log of the series, and/or the rolling means, may flatten the spikes in each series, which may exclude critical information.

Accordingly, clustering 82 (FIG. 3) may be based at least in part on density-based spatial clustering of application with noise ("DBSCAN"), which detects clusters by drawing a circle around each point and looking for other points within the same neighborhood. Embodiments of the present invention may define a cluster as having a minimum of five points, and/or a circle size of about ⅙th the entire range of points. In other words, anything falling past approximately sixteen percent (~16%) of the entire length of the graph/plot 104 with less than five (5) neighboring points is considered an anomaly. Once anomalies have been identified, the controller 18 may lookup the corresponding times that the anomalies occurred for inclusion in the indicator 28, 30 (FIG. 1).

As shown in FIG. 14, plotting the detected anomalies 28, 30 against the original visualization 84 (FIG. 4) shows abnormal events occurring at the corresponding timestamps.

In embodiments, the method 52 further includes productionalization 110 (FIG. 2), which may involve installing controllers, conforming to controller 18, on edge devices, i.e., sensors monitoring machines similar to machine 16. In such embodiments, control data from multiple machines may be passed back to a central server for analysis/detection of anomalies in accordance with the methods disclosed herein. In such embodiments, the controllers may initially collect data from the sensors for about twenty (20) minutes in order to determine the ideal part cycles, after which, the controllers may run for about fifty (50) part cycles before considering any part of the control data to be anomalous. As will appreciated, such initial data gather and delayed analysis allows the system 10 to establish a region into which part signatures should fall. After establishment of such a region, the controllers may collect control data every time a new part is created, and determine is the part is an anomaly. In embodiments, the system 10 may generate the indicator 28, 30 after a minimum threshold of two detected anomalies. As will be appreciated, the minimum threshold may vary across embodiments. An exemplary embodiment is shown in FIG. 15 in which three parts have been identified as anomalies, and where the controller 18 may clear out the region/baseline when the part being made by the machine 16 changes, and create a new region for where the part signatures of the new part should fall.

Finally, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be in real-time. For example, as previously mentioned, the system may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for monitoring machine anomalies via control data is provided. The system includes one or more sensors operative to generate control data from a machine; and a controller in electronic communication with the one or more sensors. The controller is operative to: receive the control data from the one or more sensors; generate a latent structure of part signatures from the control data; identify an anomaly within the latent structure of part signatures; and generate an indictor conveying the anomaly. In certain embodiments, the controller is further operative to: detect part cycles within the control data, and generate the latent structure of part signatures based at least in part on the part cycles. In certain embodiments, the controller is further operative to: isolate part signatures from the part cycles; and generate the latent structure of part signatures based at least in part on the isolated part signatures. In certain embodiments, the controller is further operative to identify the anomaly based at least in part on clustering the latent structure of part signatures. In certain embodiments, the controller is further operative to cluster the latent structure of part signatures via density-based spatial clustering of application with noise. In certain embodiments, the controller is further operative to: identify the anomaly within the latent structure of part signatures based at least in part on applying a transform to the latent structure of part signatures. In certain embodiments, the transform is the first derivative of the latent structure of part signatures. In certain embodiments, the controller is disposed at a separate site from the one or more sensors. In certain embodiments, the control data includes at least one of speed data, feed data, and load data.

Other embodiments provide for a method for monitoring machine anomalies via control data. The method includes generating control data via one or more sensors from a machine, and receiving the control data at a controller in electronic communication with the one or more sensors. The method further includes generating a latent structure of part signatures from the control data via the controller, identifying an anomaly within the latent structure of part signatures via the controller, and generating an indicator conveying the anomaly via the controller. In certain embodiments, the method further includes detecting part cycles within the control data via the controller. In such embodiments, generating the latent structure of part signatures is based at least in part on the part cycles. In certain embodiments, the method further includes isolating part signatures from the part cycles via the controller. In such embodiments, generating the latent structure of part signatures is based at least in part on the isolated part signatures. In certain embodiments, identifying an anomaly within the latent structure of part signatures via the controller includes clustering the latent structure of part signatures via the controller. In certain embodiments, the controller clusters the latent structure of part signatures via density-based spatial clustering of application with noise. In certain embodiments, identifying an anomaly within the latent structure of part signatures via the controller includes transforming the latent structure of part signatures. In certain embodiments, transforming the latent structure of part signatures includes generating the first derivative of the latent structure of part signatures. In certain embodiments, the controller is disposed at a separate site from the one or more sensors. In certain embodiments, the control data includes at least one of speed data, feed data, and load data.

Yet still other embodiments provide for a non-transitory computer readable medium storing instructions. The stored instructions adapt a controller to: receive control data generated by one or more sensors from a machine; generate a latent structure of part signatures from the control data; identify an anomaly within the latent structure of part signatures; and generate an indictor conveying the anomaly. In certain embodiments, the stored instructions further adapt the controller to: detect part cycles within the control data, and generate the latent structure of part signatures based at least in part on the part cycles. In certain embodiments, the stored instructions further adapt the controller to: isolate part signatures from the part cycles; and generate the latent structure of part signatures based at least in part on the part cycles. In certain embodiments, the stored instructions further adapt the controller to identify the anomaly based at least in part on clustering the latent structure of part signatures. In certain embodiments, the stored instructions further adapt the controller to: cluster the latent structure of part signatures via density-based spatial clustering of application with noise. In certain embodiments, the stored instructions further adapt the controller to identify the anomaly within the latent structure of part signatures based at least in part on applying a transform to the latent structure of part signatures. In certain embodiments, the transform is the first derivative of the latent structure of part signatures. In certain embodiments, the controller is disposed at a separate site from the one or more sensors. In certain embodiments, the control data includes at least one of speed data, feed data, and load data.

Additionally, while the foregoing embodiments have discussed machine learning in terms of PCA, it will be understood that embodiments of the present invention may implement other forms of machine learning, e.g., neural networks.

Accordingly, as will be appreciated, by applying PCA to control data, some embodiments of the present invention provide for the ability to detect anomalies in machines using only control data, as opposed to traditional system which usually rely on factors external to the paraments used to control the machine, e.g., temperature, vibrations, etc.

Further, by analyzing only control data, e.g., data from internal sensors necessary to operate the machine, some embodiments of the present invention reduce and/or eliminate the need to add additional sensors to a particular machine. In other words, some embodiments of the present invention are easily integrated into existing machines. Thus, some embodiments of the present invention provide for the detection of anomalies in machines without the need to install aftermarket equipment/sensors.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for monitoring machine anomalies via control data, the system comprising:
- one or more sensors operative to generate control data from a machine; and
- a controller in electronic communication with the one or more sensors and operative to:
- receive the control data from the one or more sensors;
- detect part cycles within the control data;
- isolate part signatures from the part cycles;
- generate a latent structure of part signatures based at least in part on the isolated part signatures;
- identify an anomaly within the latent structure of part signatures; and
- generate an indictor conveying the anomaly.

2. The system of claim 1, wherein the controller is further operative to identify the anomaly based at least in part on clustering the latent structure of part signatures.

3. The system of claim 2, wherein the controller is further operative to cluster the latent structure of part signatures via density-based spatial clustering of application with noise.

4. The system of claim 2, wherein the controller is further operative to:
- identify the anomaly within the latent structure of part signatures based at least in part on applying a transform to the latent structure of part signatures.

5. The system of claim 4, wherein the transform is the first derivative of the latent structure of part signatures.

6. The system of claim 1, wherein the controller is disposed at a separate site from the one or more sensors.

7. The system of claim 1, wherein the control data includes at least one of speed data, feed data, and load data.

8. A method for monitoring machine anomalies via control data, the method comprising:

generating control data via one or more sensors from a machine;

receiving the control data at a controller in electronic communication with the one or more sensors;

detecting part cycles within the control data;

isolating part signatures from the part cycles;

generating a latent structure of part signatures based at least in part on the isolated part signatures via the controller;

identifying an anomaly within the latent structure of part signatures via the controller; and generating an indicator conveying the anomaly via the controller.

9. The method of claim 8, wherein identifying an anomaly within the latent structure of part signatures via the controller comprises:

clustering the latent structure of part signatures via the controller.

10. The method of claim 9, wherein the controller clusters the latent structure of part signatures via density-based spatial clustering of application with noise.

11. The method of claim 9, wherein identifying an anomaly within the latent structure of part signatures via the controller comprises:

transforming the latent structure of part signatures.

12. The method of claim 11, wherein transforming the latent structure of part signatures comprises:

generating the first derivative of the latent structure of part signatures.

13. The method of claim 8, wherein the controller is disposed at a separate site from the one or more sensors.

14. The method of claim 8, wherein the control data includes at least one of speed data, feed data, and load data.

15. A non-transitory computer readable medium storing instructions that adapt a controller to:

receive control data generated by one or more sensors from a machine;

detect part cycles within the control data;

isolate part signatures from the part cycles;

generate a latent structure of part signatures based at least in part on the isolated part signatures;

identify an anomaly within the latent structure of part signatures; and generate an indictor conveying the anomaly.

* * * * *